United States Patent [19]

Busch et al.

[11] 4,443,863
[45] Apr. 17, 1984

[54] TIMER DRIVEN DISPLAY UPDATING

[75] Inventors: Dennis G. Busch; Robert J. Grafe; Gary E. Leikam, all of Austin, Tex.

[73] Assignee: International Business Machines Corporation, Armonk, N.Y.

[21] Appl. No.: 274,351

[22] Filed: Jun. 16, 1981

[51] Int. Cl.³ .............................................. G06F 3/14
[52] U.S. Cl. .................................................. 364/900
[58] Field of Search ... 364/200 MS File, 900 MS File; 340/720, 750

[56] References Cited

U.S. PATENT DOCUMENTS

| | | | |
|---|---|---|---|
| 4,065,862 | 1/1978 | Meyer | 364/200 |
| 4,156,931 | 5/1979 | Adelman et al. | 364/900 |
| 4,161,728 | 7/1979 | Insam | 340/750 |
| 4,191,956 | 3/1980 | Groothuis | 340/789 |
| 4,225,942 | 9/1980 | Kobs et al. | 364/900 |
| 4,225,943 | 9/1980 | Busch | 364/900 |
| 4,323,896 | 4/1982 | Fiedler et al. | 340/750 |
| 4,324,401 | 4/1982 | Stubben et al. | 273/85 G |

*Primary Examiner*—Jerry Smith
*Assistant Examiner*—Mark P. Watson
*Attorney, Agent, or Firm*—Harold E. Meier

[57] ABSTRACT

A data communications system for asynchronous communication having at least two data transmit/receive terminals wherein the display is periodically updated with new send or receive data. In the receive mode the data is accumulated in a receive buffer for a predetermined time interval and then transferred into a text storage buffer which then activates a display access method to process the stored data and update the display. The display access method then goes into an "idle" mode and waits for the next transfer of data which does not occur until the predetermined time interval has expired. In the transmit mode the send data is transmitted without a delay but the display is updated after the predetermined time interval has expired.

17 Claims, 6 Drawing Figures

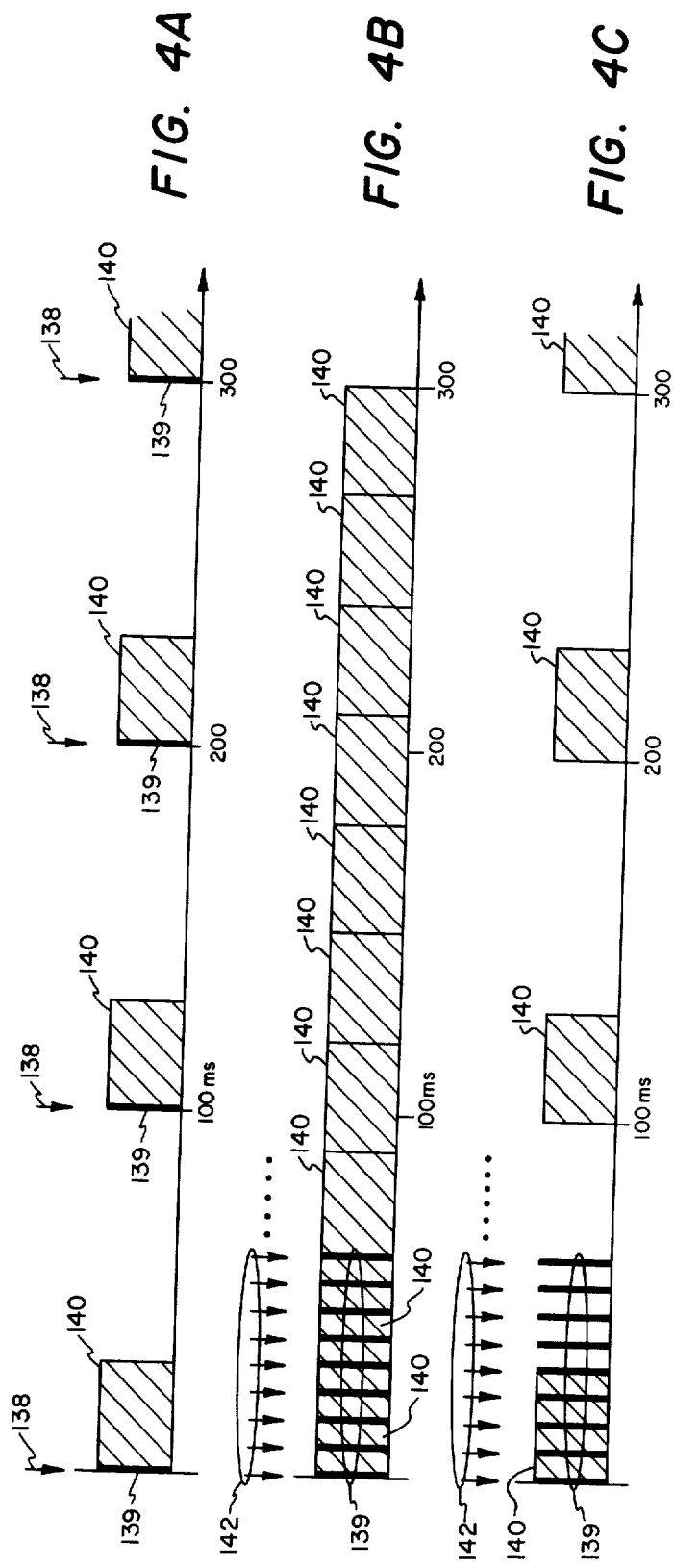

TIMER DRIVEN DISPLAY UPDATING

TECHNICAL FIELD OF THE INVENTION

The present invention relates to asynchronous data communications systems and more particularly to a method for periodically updating a display with received data in an asynchronous communications system.

BACKGROUND OF THE INVENTION

In asynchronous communication systems data is normally received and reconfigured into machine language which is a hexa-decimal representation of an alphanumeric character. This hexa-decimal character is then stored in a text storage buffer that will accumulate these characters until a software routine, called a display access method, can process them into a sufficient format for display on a cathode ray tube. The last step in the display access method will update the display with the new data.

The display access method typically takes an average of 30 milliseconds to process a given set of characters stored in the text buffer. For low transmission rates such as 110 bits per second, a new character, which normally consists of 10 or 11 bits, is received about once every 100 milliseconds. Since the display processing software only requires 30 milliseconds to register the character on the display, there remains 70 milliseconds available for additional work such as background print.

However, at a transmission rate of 1200 bits per second, a new character, which normally consists of 9 bits but may be 10 bits, occurs every 7.5 milliseconds. During each cycle of the display access method, approximately four characters will be received and stored in the receive buffer. At the end of the display access method cycle the system will recognize that new data is available in the receive buffer and this data will be transferred to the text storage buffer and the display access method will be initiated. This requires the display access method to continuously recycle consuming virtually 100% of the software overhead trying to keep the screen updated with new data.

SUMMARY OF THE INVENTION

The present invention may be briefly described as an improvement for updating the display in a data communications system which has at least one data transmit terminal and one data receive terminal. The data receive terminal is comprised of a first and second storage means, a timer, a transferral means and a display means. The first storage means stores received data which at predetermined time intervals of the timer is transferred to the second storage means by the transferral means. The display means retrieves the data from the second storage means for display.

BRIEF DESCRIPTION OF THE DRAWINGS

FIG. 4a is a timing diagram for updating the display for a prior art system using a transmission rate of 110 bits per second;

FIG. 4b is a timing diagram for updating the display for a prior art system using a transmission rate of 1200 bits per second; and FIG. 4c is a timing diagram of the present invention for updating the display using a transmission rate of 1200 bits per second.

DETAILED DESCRIPTION OF THE INVENTION

Figure 1:
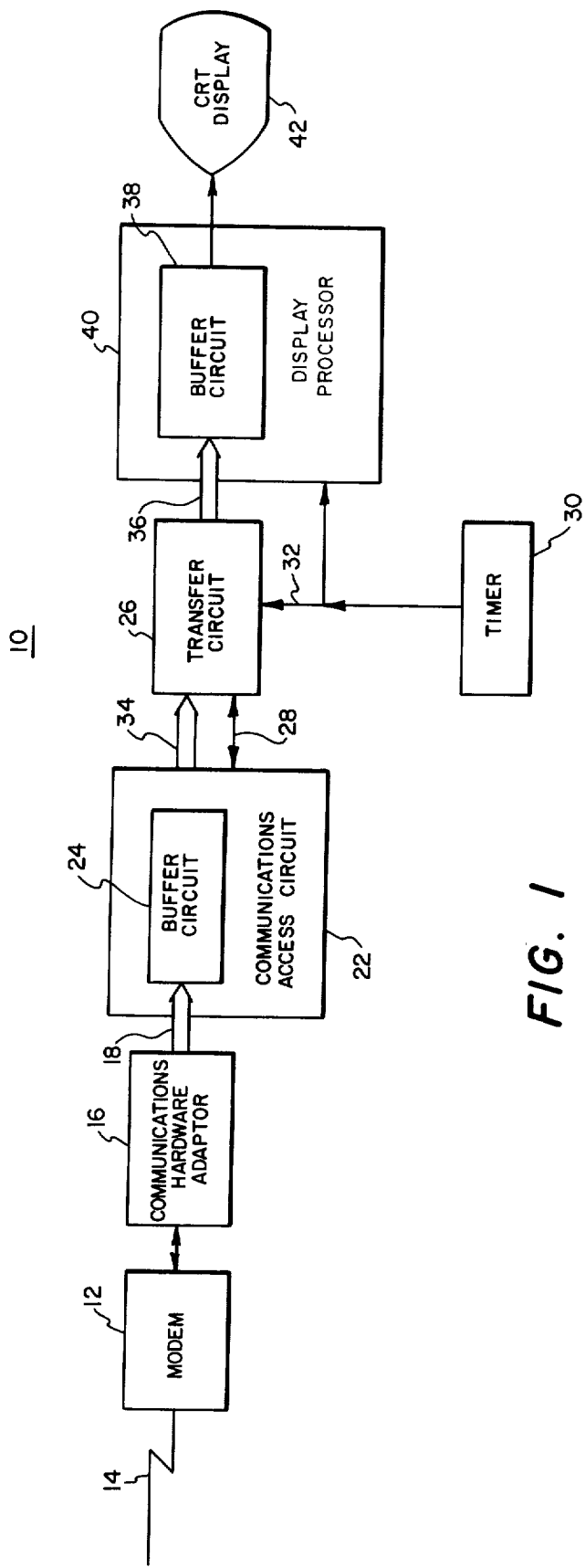
FIG. 1 is a block diagram of a transmit/receive data terminal.

Referring to FIG. 1 there is shown a data transmit/-receive terminal 10. A modem 12 is utilized to connect the terminal 10 to a communication link 14 through a communications hardware adapter 16. The communications hardware adapter 16 converts the data from parallel to serial for transmission of data, or serial to parallel for receiving data.

In the receive mode of data terminal 10 data will be received by the combination of the modem 12 and the communications hardware adapter 16 and transmitted along data bus 18 to the communications access circuit 22 where the data is stored in a buffer circuit 24. A transfer circuit 26 interfaces with the communications access circuit 22 through a control line 28 to determine if there is any data stored in the buffer circuit 24. The communications access circuit 22 primarily reformats the data into machine language for internal storage and also provides an indication to the rest of the system that there is received data present. At predetermined intervals, determined by a timer 30 which is connected to the transfer circuit 26 through a line 32, the transfer circuit 26 will transfer data from the buffer circuit 24 through a data bus 34 to a data bus 36 for storage in a buffer circuit 38 which is part of a display processor 40.

The display processor 40 is responsive to the timer 30 and after the data has been transferred from the buffer circuit 24 and stored in the buffer circuit 38 the display processor 40 will reformat the data in a suitable format for displaying on a CRT display 42. Normally the buffer circuits 24 and 38 consist of random access memories.

Figure 2:
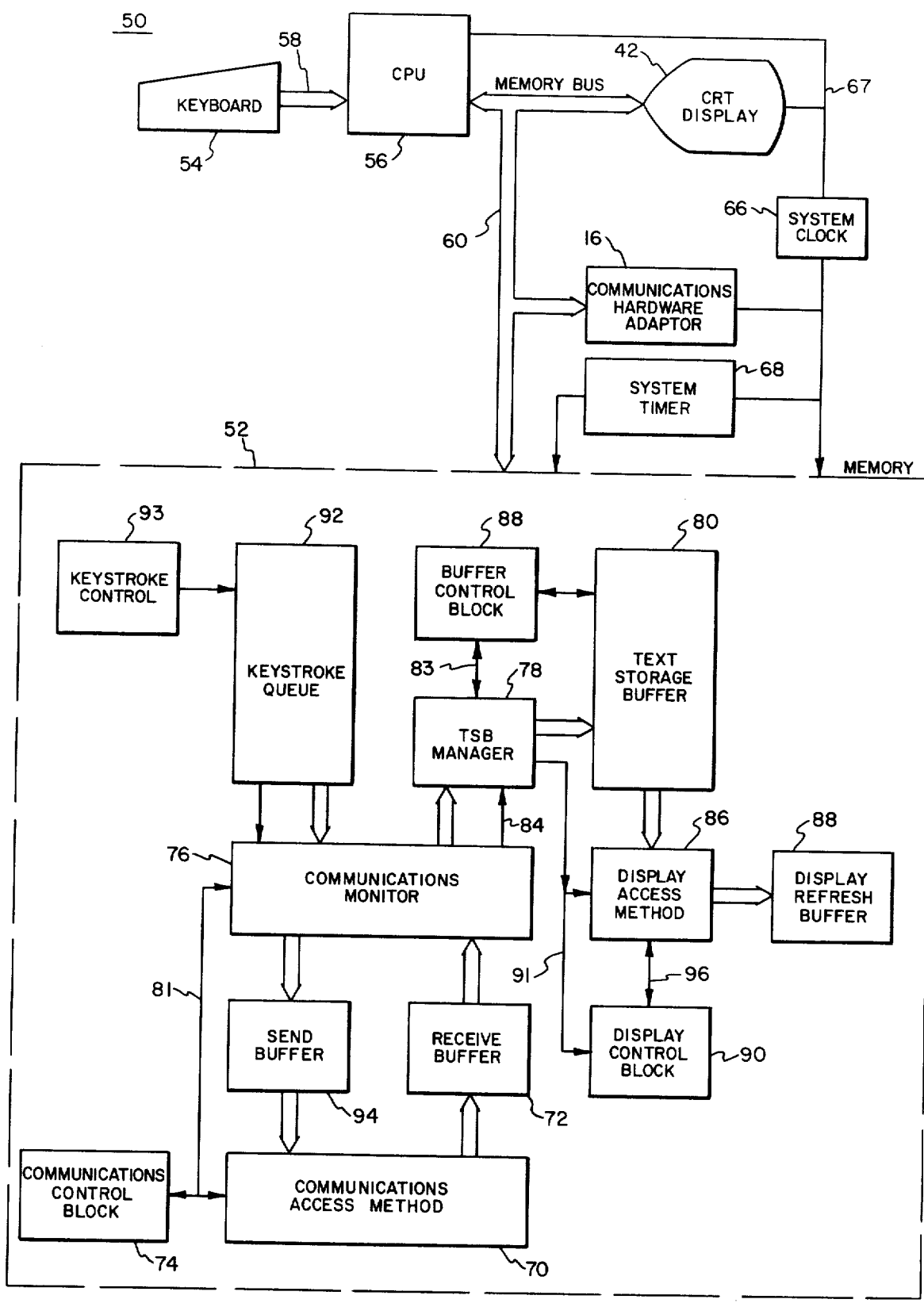
FIG. 2 is a system schematic diagram of a transmit/-receive data terminal.

Now referring to FIGS. 1 and 2, there is shown a system schematic diagram of the transmit/receive data terminal 10 which will be referred to generally as a system 50. The system 50 consists of a keyboard 54 that inputs data to a central processing unit (CPU) 56 through a data bus 58. The CPU 56 communicates with the entire system 50 through a memory bus 60. The CPU 56 controls the interface between the CRT display 42, the communications hardware adapter 16 and a memory 52. A system clock 66 is provided to synchronize all the elements of the system 50 through a line 67. A system timer 68, which is essentially the timer 30 in FIG. 1, provides a fixed internal time base which is derived from counting pulses of the system clock 66. The memory 52 uses the fixed time interval of the system timer 68 for various functions which will be described below.

The communications hardware adapter 16 adapts the signal received from the modem 12 such that it can be transmitted along memory bus 60. The system 50 recognizes when a character of data has been received and interrupts any ongoing software functions to process the received data. Normally reception of data is given a high priority relative to the other functions that the CPU 56 performs and therefor all new data will be received and stored by a method which will be described below.

In the receive mode a communications access method 70 receives the raw data and reformats it in machine language for storage in a receive buffer 72. Normally machine language will consist of characters in a hexidecimal format. The communications access method 70 is bi-directional and also reformats machine language character into a suitable form for transmission which will be discussed below. In the receive mode, for each character that is processed by the communication access method 70 and stored in the receive buffer 72 a communications control block 74 will increment an internal pointer providing a reference so that the system can determine how many characters are stored in the receive buffer 72.

A communications monitor 76 is a subroutine that will determine if there is any data in the receive buffer 72 and when this data should be fetched and distributed to the rest of the system 50. The communications monitor 76, at predetermined intervals, will fetch the data from the receive buffer 72 and store the data in an internal register in the communications monitor 76. The communications monitor 76 will then transfer the data through a TSB manager 78 to a text storage buffer 80. The communications monitor 76 communicates with the communications control block 74 through a control line 81 such that it can determine the number of characters stored in the receive buffer 72. Each received character is individually retrieved by the communications monitor 76 and transferred to the TSB manager 78. The TSB manager 78 only stores one character in an internal register before transferring it to the text storage buffer 80.

As each character of data is transferred through the TSB manager 78 to the text storage buffer 80 a buffer control block 82 will increment the character into the text storage buffer such that the data can be retrieved by reversing the process. A control line 83 links the buffer control block to the the TSB manager 78 to indicate when to store a character while a control line 84 links the TSB manager 78 to the communication monitor 76.

When all the data in the receive buffer 72 is transferred to the text storage buffer 80, a display access method 86 processes the data. The display access method 86 is a subroutine that reformats the characters in the text storage buffer 80 and stores them in a display refresh buffer 88. The display refresh buffer 88 will maintain constant display of the old data until new data has been received.

A display control block 90 interfaces with the TSB manager 78 through a control line 91 to determine how many characters have been stored in the text storage buffer 80. The display control block 90 will transfer this information to the display access method through a control line 96.

The display access method 86 only operates after the received data has been transferred into the text storage buffer 80. The communication monitor 76 does not transfer the received data until a fixed interval derived from the system timer 68 has occurred as will be described below. This will make the display access method 86 dependent on the system timer 68.

In the transmit mode send data is fed into the CPU 56 from the keyboard 54. A keystroke control 93 controls a keystroke queue 92 which processes the data received from the keyboard 54. The keystroke queue 92 reformats the send data from the keyboard 54 into machine language for distribution to the communication monitor 76. Prior to transfer to the communications monitor 76 the data is stored in the keystroke queue in an internal register.

The communication monitor 76 transfers the send data from the keystroke queue 92 to a send buffer 94. The send buffer 94 is a register of random access memory which stores one or two characters. These characters are then processed by the communication access method 70 which reformats each character for transmission through the communication hardware adapter 16 and modem 12 as shown in FIG. 1.

After each character is transferred to the send buffer 94 by the communication monitor 76 and transmitted through the communication link 14 the character is also transferred to the TSB manager 78 for storage in the text storage buffer 80 in the same manner as for the receive mode. When the system timer 68 expires it will create a fixed time interval which is used by the communication monitor 76 to determine when to initiate the display access method 86 whereby the data stored in the text storage buffer 80 will be processed and stored in the display refresh buffer 88.

The basic distinction between the transmit and receive modes is that in the transmit mode the data is stored in the text storage buffer 80 without reference to the system timer 68 whereas in the receive mode the data is not stored in the text storage buffer 80 until the system timer 68 has expired. In both modes the display access method 86 still operates in response to the system timer 68 and does not process the data stored in the text storage buffer 80 until the period of the system timer has expired.

Figure 3:
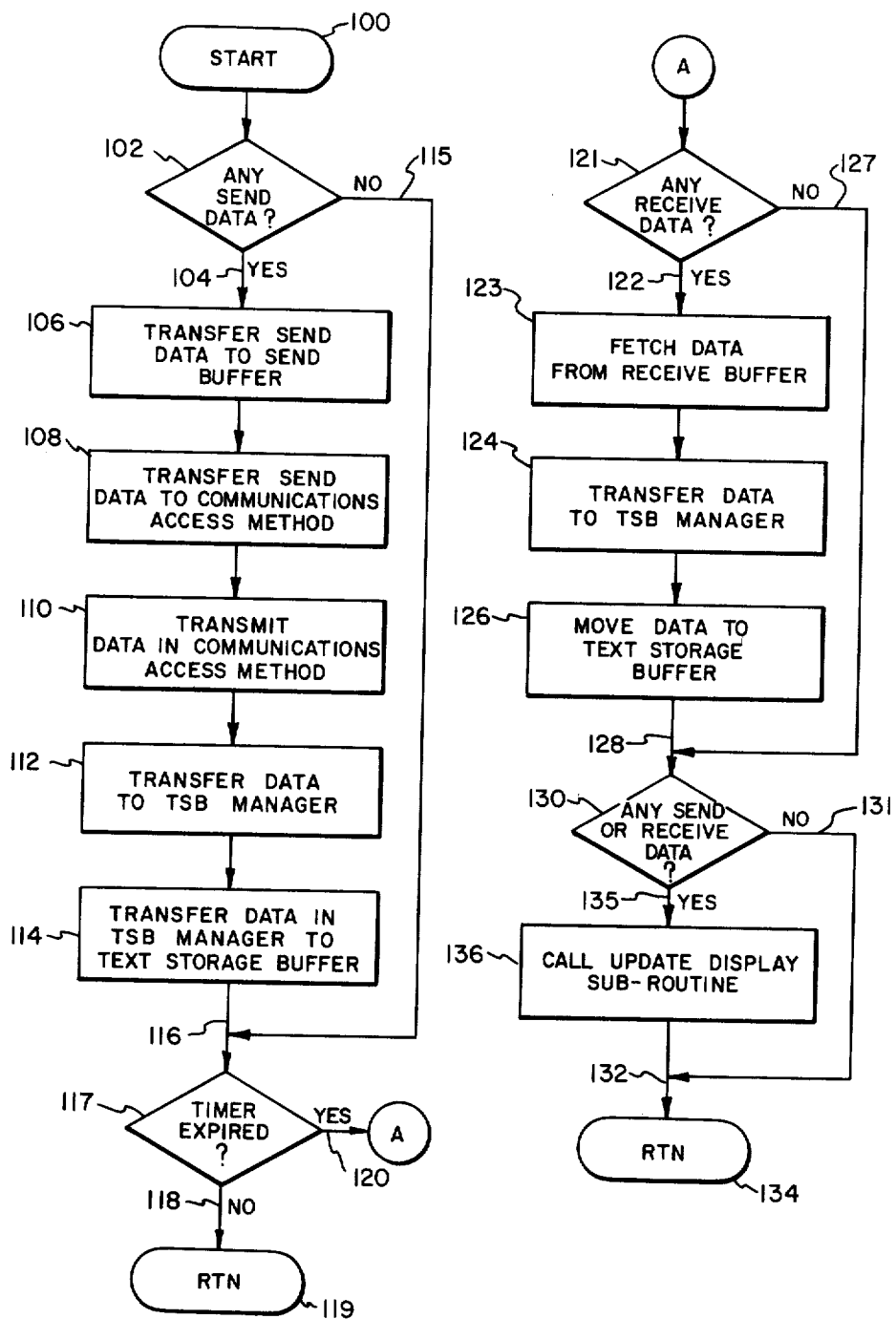
FIG. 3 is a flow chart of the invention depicting the operation of the terminal when data is sent or received.

Referring now to FIGS. 2 and 3 there is shown a flow chart of the program for updating the display with send or receive data. Block 100 is a start block which could be initiated by an interrupt signal that is responsive to the presence of send or receive data. As noted above, the reception of data is given a high priority among the basic functions that are performed by the CPU 56. This allows the system 50 to perform its normal functions without missing any received data.

There are essentially two conditions that will start the program. If any send data is keyed in from the keyboard 54 then the program will start and store the send data in the send buffer 94 for transmission and in the text storage buffer 80 for display. When the timer 68 expires it will prompt the system to see if there is any receive data in the receive buffer 72 and if there is it will start the program.

A decision block 102 determines whether there is any send data. If there is send data then the flow chart proceeds along a "yes" path 104 to a function block 106. Function block 106 indicates the step whereby the data character is transferred through the communication monitor 76 to the send buffer 94. It should be understood that the data is first stored in an internal register in the communication monitor 76 prior to transfer to the send buffer 94.

The next step is a function block 108 which indicates a step whereby the data stored in the send buffer 94 is transferred to the communications access method 70 to reformat the data for proper transmission. The next step is a function block 110 whereby the data in the communications access method is transmitted through the communications hardware adapter 16 and the modem 12 to the communications link 14. In the next step, as indicated by a function block 112, the data character which is stored in the communications monitor 76 is transferred to the TSB manager 78. The next step is a function block 114 which indicates the step whereby the data stored in the TSB manager 78 is transferred to the text storage buffer 80.

If there is no send data then the decision block 102 will route the program along a "no" path 115 to an intersection point 116. The next block of the flow diagram is a decision block 117 which determines whether the system timer 68 has expired. If the timer has not expired then the program will flow along a "no" path 118 to a return command block 119. The command will return control to the main program.

When either the system timer 68 has expired or more send data is input the program will re-enter the program at start block 100 and flow through the program to the decision block 117 and flow along the "yes" path 120 to a decision block 121. The decision block 121 determines if there is any received data present in the receive buffer 72. If there is received data present then the program flows along a "yes" path 122 of the decision block 121 to a function block 123 which indicates the step whereby data is fetched from the receive buffer 72. This data has been stored in the receive buffer 72 by the communication access method 70 as each character has been received through the communications link 14. All new data that has been received during the timer interval will be stored in the receive buffer 72.

The program then flows to a function block 124 which indicates the step whereby the data is transferred through the communication monitor 76 to the TSB manager 78 on a character by character basis. The data is then transferred from the TSB manager 78 to the text storage buffer 80 as indicated by a function block 126. It should be understood that function blocks 123 to 126 operate to transfer each character of data from the receive buffer 72 to the text storage buffer 80 in a sequential manner. The TSB manager 78 will only store one character at a time before passing it on to the text storage buffer 80. Steps 123 to 126 will operate to remove all the data in the receive buffer 72 before proceeding.

If there is no receive data when the timer expires then the program will flow along a "no" path 127 of the decision block 121 to an intersection point 128. The program then proceeds to a decision block 130 to decide if there has been any send or receive data present. If there has not been any send or receive data transferred through the communications monitor 76 and stored in the text storage buffer 80, the program will flow along a "no" path 131 of the decision block 130 to an intersection point 132 and the program will proceed to a return command 134 which returns the system to the main program.

If there is send or receive data present during the operation of the program then the program will flow along a "yes" path 135 of the decision block 130. This will direct the program to a function block 136 which indicates the step whereby an update display subroutine is addressed that will initiate the display access method 86. The display access method 86 will then fetch the data from the text storage buffer 80 and reformat for storage in the display refresh buffer 88. The program will then proceed to the return command block 134 and control will be returned to the main program.

Now referring to FIGS. 4a, 4b, 4c, FIG. 3, and FIG. 2, there is shown a set of timing diagrams that illustrate the interaction between the communication monitor 76 and the display access method 86. Referring in particular to FIG. 4a there is shown the timing diagram for a prior art system with the communication monitor 76 operating without reference to the timer 68 and using a low speed transmission rate of 110 bits per second. A plurality of arrows 138 indicate the character rate on the communication link 14 in FIG. 1. It can be seen that at the 110 bit per second transmission rate that one 11 bit character occurs every 100 milliseconds. It should be understood that at the low transmission rate either a 10 bit or an 11 bit character may be transmitted. The 11 bit character is used as it would result in the lowest transmission rate.

Raw data is received by the communications access method 70 and transferred to the TSB manager 78 which stores the data in the text storage buffer 80. There is no accumulation in the receive buffer 72. The software time that is occupied during the processing time is the character service time 139 as indicated by a plurality of solid lines. This time is approximately 1 millisecond and occurs each time a character is received. After each character is received and processed the display access method 86 is initiated and reformats the character and stores it in the display refresh buffer 88. The software time that is occupied by this operation is indicated by a plurality of shaded areas termed a display update time 140. This time can range from 20 to 50 milliseconds depending upon the type of characters and the number of characters that are processed but the normal time averages around 30 milliseconds. This leaves an available CPU 56 resource time of approximately 70 milliseconds for operations such as background print.

Referring now to FIG. 4b there is shown a timing diagram for a transmission rate of 1200 bits per second in a system with a communication monitor 76 that is not controlled by the system timer 68. The character rates on the communication link 14 are denoted by a plurality of arrows 142. For a data rate of 1200 bits per second a 9 bit character occurs every 7.5 milliseconds. It should be understood that at a 1200 bit per second transmission rate a 9 bit or a 10 bit character may be transmitted. The 9 bit character is used for illustration as it would result in the highest transmission rate. The character service time 139 remains approximately the same as for the 110 bit per second transmission rate.

At time equal zero, which is not shown, the first received character will initiate the display access method 86 and process the first character for storage in the display refresh buffer 88. During the display update time 140, while the display access method 86 is processing the first received character, four new characters have been received and are processed by the communications access method 70 and stored in the receive buffer 72. As soon as the display access method 86 processes a character, the communications monitor 76 recognizes that additional data is stored in the receive buffer 72 and proceeds to process these characters by transferring these characters to the TSB manager 78 and then to the text storage buffer 80. All four characters now in the text storage buffer 80 will be processed by the display access method 86 during the next display update time 140.

As shown in FIG. 4b after the first cycle occurs, which is not shown, there will always be a block of four new characters in the receive buffer 72 waiting to be processed by the display access method. The diagram only shows the steady state condition. As long as data is being transmitted at the 1200 bit per second transmission rate it can be seen that the system is virtually occupied 100% of the time with updating the display 42. The display is essentially being updated at the rate of once every 30 milliseconds.

Referring in particular to FIG. 4c there is shown a system timing diagram for a transmission rate of 1200 bits per second using the communication monitor 76 that is controlled by the system timer 68. The arrows 142 denote the character rate on a communication link 14 as in FIG. 4b. At the 1200 bits per second transmission rate a 9 bit character is received every 7.5 milliseconds as discussed above. The receive buffer 72 will accumulate these characters until the communication monitor 76 transfers them to the text storage buffer 80. In the prior art, as described above with reference to FIGS. 4a and 4b, the communications monitor 76 transferred the character as it was received. In the present invention, the communications monitor 76 will transfer the data in the receive buffer 72 at the end of a 100 millisecond time interval determined by the system timer 68. Approximately 13 characters at a 1200 bit per second transmission rate will have been received and stored in the receive buffer 72 during the timer interval. When the system timer 68 expires the 13 characters will be transferred through the communications monitor 76 to the TSB manager 78 and stored in the text storage buffer 80. Upon completion of this transfer time which takes approximately 1 millisecond, which is not shown, the display access method 86 is initiated and the information contained in the text storage buffer 80 will be reformatted and stored in the display refresh buffer 88. This is the display update time 140 as discussed above which takes an average of 30 milliseconds.

It can be seen that the available CPU resource time is now approximately 70 milliseconds between the updating period. Instead of seeing groups of four characters displayed every 30 milliseconds as was the case in FIG. 4b without the communication monitor 76 controlled by the system timer 68, the operator now sees a block of thirteen characters displayed every 100 milliseconds. Since the operator cannot distinguish between a block of four characters updated every 30 milliseconds and a block of thirteen characters updated every 100 milliseconds the updating of the display appears fluid to the operator.

It should be understood that the time interval in which the receive buffer 72 accumulates data prior to transfer by the communication monitor 76 is not limited to 100 milliseconds. Longer time intervals can be employed with the only limitation being the effect on the terminal operator and the size of the receive buffer 72.

For a 100 millisecond time interval there is no advantage when the transmission rate is 110 bits per second. As can be seen in FIG. 4a only one character occurs every 100 milliseconds so the updating takes place only every 100 milliseconds in any event. The advantage obtained by accumulating the data in the receive buffer 72 and processing the data through the display access method 86 at predetermined intervals is at the higher transmission rates.

Although not shown in the drawings it should be understood that another embodiment of the invention may include a disk storage element which will input data to the communications monitor 76 at a faster rate than a keyboard operator. A keyboard operator is normally limited in speed to about two to four characters per second. A disk storage element, however, can input data at the 1200 bit per second transmission rate.

Although a preferred embodiment of the invention has beeen described in detail, it should be understood that various changes, substitutions, and alterations can be made therein without departing from the spirit and scope of the invention as defined by the appended claims.

What is claimed is:

1. In a data communications system having at least one data transmit terminal and one data receive terminal, said data receive terminal having display means for displaying received data on a character by character basis, the improvement comprising:

first storage means for storing said received data;
a timer for establishing fixed time intervals;
transfer means connected to said timer for transferring said received data from said first storage means at the end of each of said fixed time intervals; and
second storage means for receiving and storing said received data as transferred by said transfer means from said first storage means;
said display means connected to said second storage means and being activated at the end of each of said fixed time intervals for simultaneously displaying on a display terminal all data stored in said second storage means.

2. A data transmission system as defined in claim 1 wherein said first storage means comprises a receive buffer.

3. A data transmission system as defined in claim 1 wherein said first storage means comprises a random access memory.

4. A data transmission system as defined in claim 1 wherein said second storage means comprises a text storage buffer.

5. A data transmission system as defined in claim 1 wherein said second storage means comprises a random access memory.

6. In a data communication system having at least two data transmit/receive terminals, each of said transmit/receive terminals having display means for displaying transmit and received data on a character by character basis, the improvement comprising:

data input means for entering data to be transmitted;
first storage means for storing data received at a terminal;
a timer for establishing fixed time intervals;
transfer means connected to said timer for transferring said received data from said first storage means at the end of each of said fixed time intervals and for transferring said transmit data from said data input means;
second storage means for receiving and storing said transmit data transferred by said transfer means from said data input means; and
third storage means for receiving and storing said transmit and received data transferred by said transfer means;
said display means connected to said third storage means and being activated at the end of each of said fixed time intervals for simultaneously displaying on a display terminal all data stored in said third storage means.

7. A data transmission system as defined in claim 6 wherein said data input means comprises a keyboard.

8. A data transmission system as defined in claim 6 wherein said first storage means comprises a receive buffer.

9. A data transmission system as defined in claim 6 wherein said first storage means comprises a random access memory.

10. A data transmission system as defined in claim 6 wherein said second storage means comprises a send buffer.

11. A data transmission system as defined in claim 6 wherein said second storage means comprises a random access memory.

12. A data transmission system as defined in claim 6 wherein said third storage means comprises a text storage buffer.

13. A data transmission system as defined in claim 6 wherein said third storage means comprises a random access memory.

14. In a data transmission system having at least two data transmit/receive terminals, each of said transmit/receive terminals having display means for displaying transmit and received data on a character by character basis, the improvement comprising:
a keyboard for inputting data to be transmitted;
a receive buffer for storing data received at a terminal;
a timer for establishing fixed time intervals;
transfer means connected to said timer for transferring said received data from said receive buffer at the end of each of said fixed time intervals and for transferring said transmit data from said keyboard;
a send buffer for storing said transmit data transferred by said transfer means; and
a text storage buffer for receiving and storing said transmit and received data transferred by said transferral means;
said display means connected to said text storage buffer for simultaneously displaying on a display terminal said received and transmit data stored in said text storage buffer, said display means activated at the end of each of said fixed time intervals after transferral of said received and transmit data to said text buffer; and
transmission means for transmitting said transmit data stored in said send buffer.

15. A data transmission system as defined in claim 14 wherein said receive buffer comprises a random access memory.

16. A data transmission system as defined in claim 14 wherein said send buffer comprises a random access memory.

17. A data transmission system as defined in claim 14 wherein said text storage buffer comprises a random access memory.

* * * * *